United States Patent
Morrison et al.

(10) Patent No.: US 9,297,269 B2
(45) Date of Patent: Mar. 29, 2016

(54) PATTERNED REDUCTION OF SURFACE AREA FOR ABRADABILITY

(75) Inventors: Jay A. Morrison, Oviedo, FL (US); Jay E. Lane, Mims, FL (US); Gary B. Merrill, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 1764 days.

(21) Appl. No.: 11/800,801

(22) Filed: May 7, 2007

(65) Prior Publication Data

US 2008/0280101 A1   Nov. 13, 2008

(51) Int. Cl.
*B32B 3/30* (2006.01)
*F01D 11/12* (2006.01)

(52) U.S. Cl.
CPC ............... *F01D 11/122* (2013.01); *B32B 3/30* (2013.01); *F05D 2250/18* (2013.01); *F05D 2250/70* (2013.01); *F05D 2300/21* (2013.01); *F05D 2300/603* (2013.01); *Y10T 428/24355* (2015.01)

(58) Field of Classification Search
None
See application file for complete search history.

(56) References Cited

U.S. PATENT DOCUMENTS

| 4,423,097 | A | 12/1983 | Mons et al. |
| 4,764,089 | A | 8/1988 | Strangman |
| 4,884,820 | A | 12/1989 | Jackson et al. |
| 5,314,304 | A * | 5/1994 | Wiebe .................. 415/173.4 |
| 5,681,616 | A | 10/1997 | Gupta et al. |
| 5,705,231 | A | 1/1998 | Nissley et al. |
| 6,013,592 | A | 1/2000 | Merrill et al. |
| 6,203,021 | B1 * | 3/2001 | Wolfla et al. .................. 277/415 |
| 6,235,370 | B1 * | 5/2001 | Merrill et al. ................. 428/116 |
| 6,457,939 | B2 * | 10/2002 | Ghasripoor et al. ....... 415/174.4 |
| 6,617,013 | B2 | 9/2003 | Morrison et al. |
| 6,641,907 | B1 | 11/2003 | Merrill et al. |
| 6,670,046 | B1 | 12/2003 | Xia |
| 6,703,137 | B2 | 3/2004 | Subramanian |
| 6,733,907 | B2 | 5/2004 | Morrison et al. |
| 6,830,428 | B2 * | 12/2004 | Le Biez et al. ............. 415/173.4 |
| 6,887,528 | B2 | 5/2005 | Lau et al. |
| 6,916,529 | B2 | 7/2005 | Pabla et al. |
| 6,946,208 | B2 | 9/2005 | Subramanian et al. |
| 2002/0106457 | A1 * | 8/2002 | Lee et al. ....................... 427/404 |
| 2005/0129511 | A1 | 6/2005 | Allen |
| 2008/0206542 | A1 * | 8/2008 | Vance et al. ............... 428/304.4 |

* cited by examiner

*Primary Examiner* — Frank D Ducheneaux

(57) ABSTRACT

A gas turbine component (20) with a layer of ceramic material (22) defining a wear surface (21), in which an array of cross-shaped depressions (26A, 26B) formed in the wear surface (21) define a continuous labyrinth of orthogonal walls (28, 30) of the ceramic material, and reduce the area of the wear surface (21) by about 50%. Within a representative area (36) of the wear surface (21), the depressions (26A, 26B) provide a ratio of a lineal sum of depression perimeters (27) divided by the representative area (36) of the wear surface of least 0.9 per unit of measurement for improved abradability characteristics of the wear surface (21).

12 Claims, 2 Drawing Sheets

| | Depression shape | W (mm) | ROA | P/A (mm $^{-1}$) |
|---|---|---|---|---|
| ○ | Circles | 1.0 | 50% | 0.69 |
| ⬡ | Honeycomb | 1.0 | 50% | 0.83 |
| ⬭ | Racetrack | 1.0 | 50% | 0.65 |
| ✛ | Crosses | 1.0 | 45% | 1.00 |

…

PATTERNED REDUCTION OF SURFACE AREA FOR ABRADABILITY

FIELD OF THE INVENTION

The present invention relates to thermal barrier coatings, and more particularly to abradable ceramic coatings such as used on gas turbine blade ring segments.

BACKGROUND OF THE INVENTION

Each disc of rotating blades in the turbine section of a gas turbine is closely surrounded by a segmented blade ring located adjacent the blade tips to prevent the working gas from bypassing the blades by going over the blade tips. Some blade ring segments operate at temperatures over 1500° C., and have a ceramic thermal barrier coating (TBC) on a substrate of metal or ceramic matrix composite (CMC) material. To allow minimum clearance between the blade tips and the ring segments, the insulating TBC is desirably abradable to reduce wear of the tips upon contact with the coating. An abradable TBC composed of hollow ceramic spheres in a ceramic matrix is disclosed in U.S. Pat. No. 6,641,907 of the present assignee. Another way to increase abradability is to form a pattern of cavities in the TBC as in U.S. Pat. No. 6,830,428.

BRIEF DESCRIPTION OF THE DRAWINGS

The invention is explained in the following description in view of the drawings that show.

DETAILED DESCRIPTION OF THE INVENTION

Figure 1:
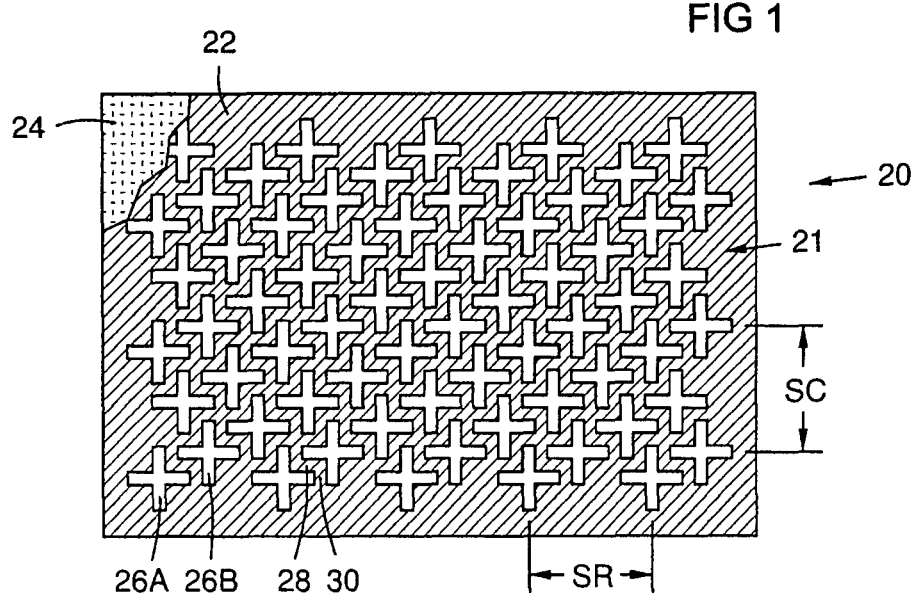
FIG. 1 is a surface view of a thermal barrier coating with a pattern of cross-shaped depressions according to an exemplary embodiment of the invention.

FIG. 1 illustrates an inner surface 21 of a gas turbine blade ring segment 20 with a thermal barrier coating 22 of ceramic material on a substrate 24. A pattern of cross-shaped depressions 26A, 26B are formed in the coating 22 in accordance with an exemplary embodiment of the invention. These depressions serve to reduce the surface area and the solid volume of the coating 22, and thus make it more abradable.

Figure 2:
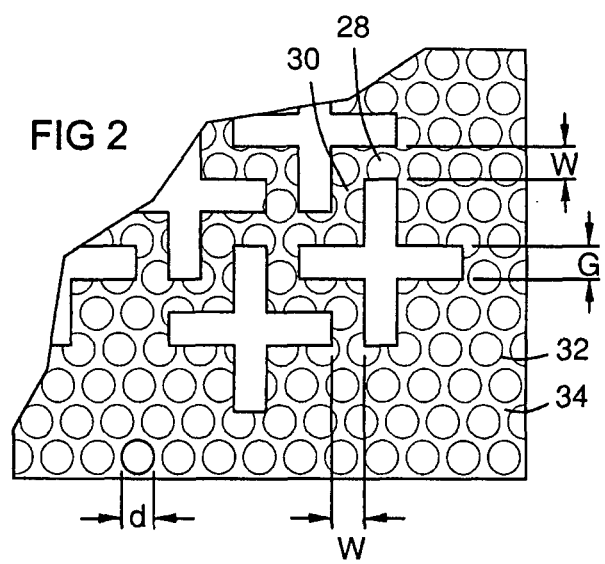
FIG. 2 is a partial enlarged view of FIG. 1 showing hollow ceramic spheres in the thermal barrier coating.

The illustrated cross-shaped repeating pattern of this embodiment has the following desirable characteristics: 1) the depressions are discontinuous or discrete, i.e. not connected to each other, thereby preventing loss of gas seal around an abrading blade tip; 2) the depressions reduce the surface area by about 50%, or between 40%-60%; 3) the depressions have a perimeter/area (P/A) ratio greater than 0.9, as discussed more fully below; and 4) the depressions define a continuous labyrinth of walls 28, 30 oriented in two orthogonal directions, thus maximizing surface stability. The walls separate the depressions from each other, and may have a substantially uniform thickness W as shown in FIG. 2. The pattern of crosses 26A, 26B may be formed into the thermal barrier coating by laser cutting, end milling, ultrasonic machining with shaped tools, or by other known means.

FIG. 2 is a partial enlarged view of FIG. 1, illustrating that the thermal barrier coating 22 may include hollow ceramic spheres 32 in a ceramic matrix 34, such as in the material described in U.S. Pat. No. 6,641,907. The spheres may have a range of diameters or they may be substantially uniform. It one embodiment the wall thickness W may be as little as half of the maximum diameter d of the spheres 32. For example the wall thickness W may be between 0.5 and 1.5 times the maximum diameter d. Such relatively thin walls are possible due to the stable geometry of the continuous wall labyrinth. By comparison, patterns with continuous or connected depressions and discontinuous walls require a wall thickness W greater than 1.5 times the maximum diameter d in order to provide stability for the wall in the event that a void is created when a hollow ceramic sphere is partially removed and then becomes dislodged when the depressions are formed.

One way to describe the pattern of depressions 26A, 26B is that the first cross-shaped depression 26A is separated laterally and vertically from the second cross-shaped depression 26B by walls 28, 30 of substantially uniform thickness in two orthogonal orientations, producing adjacent diagonally offset nested crosses. The term "two orthogonal orientations" is used herein to describe a geometry (such as is illustrated in FIG. 1, for example) where a wall separating any two adjacent depressions has a first portion extending in a first direction along the surface, and a second portion connected at an end of the first portion, the second portion extending in a second direction along the surface perpendicular to the first portion. This description can be applied to any two of the adjacent depressions such as 26A and 26B as shown or others on diagonals of the same or the opposite direction.

Figure 3:
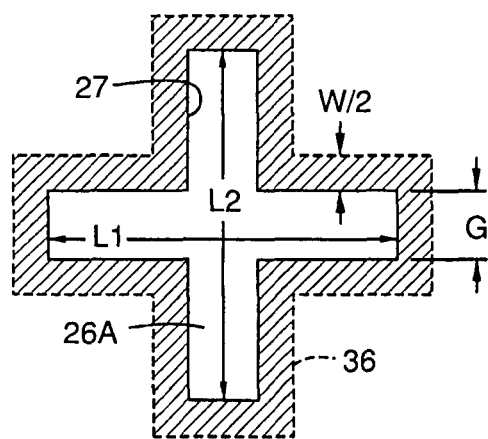
FIG. 3 illustrates a representative area of the surface for calculating specified ratios of depression area and depression perimeter length relative to the surface area.

FIG. 3 illustrates an area of the surface selected to contain a representative ratio of depression(s) 26A and walls 28, 30. A measurement boundary 36 may be defined around an area on the surface 21 within the array of depressions 26A, 26B that is representative of the reduced-area surface in terms of the amount of surface area removed versus the amount of surface area remaining. FIG. 3 shows a single depression 26A bordered by half the wall thickness W/2. Within this measurement boundary 36, a P/A ratio may be defined as the length P of depression perimeter(s) 27 divided by the total area A within the boundary 36.

As an example embodiment, let the depression 26A have a substantially uniform width G of 1 mm and dimensions L1 and L2 of 5 mm each, and let the walls 28, 30 have a substantially uniform thickness W of 1 mm. The boundary 36 defines a border (hatched portion) of ½ the wall thickness, or ½ mm around the depression. The total area within the boundary 36 is 20 mm$^2$, and the perimeter 27 of the depression 26A is 20 mm long, so the perimeter/area ratio or P/A is 1.0 mm$^{-1}$. The area of the depression 26A at the surface 21 is 9 mm$^2$, so the surface reduction is 9/20 or 45%. This example assumes that the surface is planar; however, the calculations are also applicable for the curved inside diameter abraded surface of a gas turbine ring segment, since a ring segment abraded surface functions as a planar surface in relationship to a rotating blade tip. Thus, surface 21 of FIG. 1 is actually a cylindrical surface for the embodiment of a gas turbine ring segment, but the calculations above have been performed as though that surface 21 were flattened out to become a plane for clarity and simplicity.

Using the above dimensions, each row of crosses (horizontally aligned in FIG. 1) is offset laterally from each adjacent (vertically offset) row by 40% of the distance SR separating the crosses in a given row. Likewise, each column of crosses is offset vertically from each adjacent column by 40% of the distance SC separating the crosses in a given column. Another way to describe this is that adjacent rows are offset laterally by 0.4 SR and vertically by 0.4 SC forming a nested pattern of depressions. SR and SC may be equal as illustrated or may be unequal if the crosses are elongated. Nested depressions 26A, 26B align in a diagonal direction, but not at an obvious angle, such as 30, 45, or 60 degrees. The angle of diagonal alignment depends on the relative magnitudes of L1, L2, G, and W. In the above-described example, the diagonal alignment of depressions 26A and 26B as determined by the arctan (2÷4) is 26.57° from the horizontal.

Figures 4, 5:
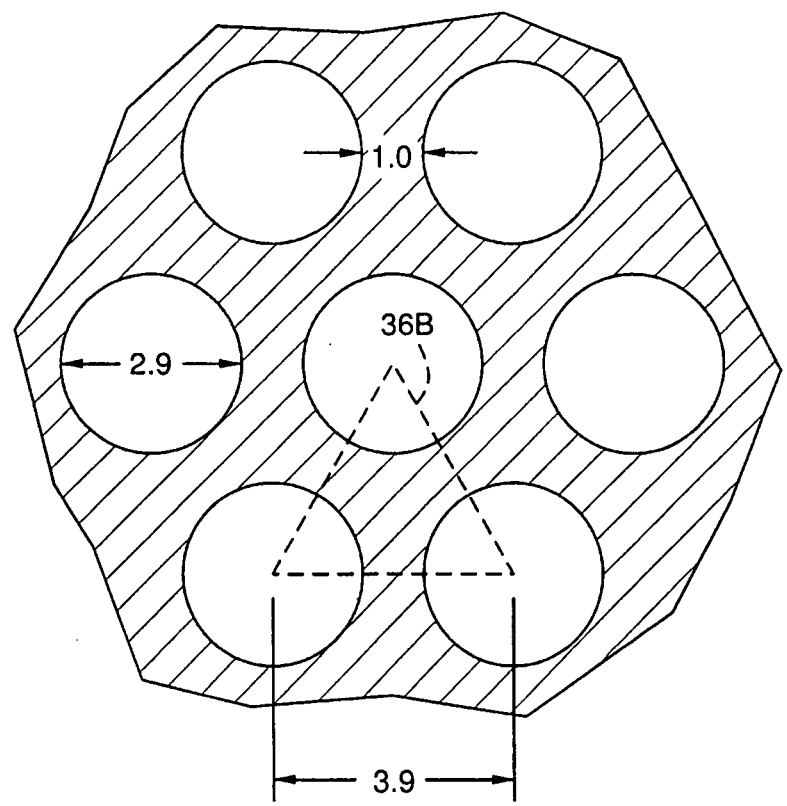
FIG. 4 is a table of characteristics of various surface reduction patterns.
FIG. 5 shows a geometry of circular depressions as measured for the table.

Various depression geometries may be compared as shown in FIG. 4. Only closed cell geometries (disconnected depressions) are considered here, since they have the advantage of preventing gas leakage around the blade tips, and they allow thinner walls than open cell geometries (continuous depressions). Each geometry is selected to provide a minimum wall thickness of 1.0 mm and a reduction of area (ROA) of approximately 50%. The circle geometry listed in FIG. 4 is illustrated in FIG. 5, with its representative triangular-shaped measurement boundary 36B. The pattern of crosses has a higher P/A ratio than the other patterns, and it is the only pattern with P/A greater than 0.9/mm. A high P/A ratio is desired for the reduced-area surface because the increased presence of material edges provides improved abradability. A P/A ratio of at least 1.0 per unit of measurement is enabled in the illustrated embodiment.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A gas turbine component comprising:
a substrate;
a layer of ceramic material disposed over the substrate;
a repeating pattern of unconnected cross-shaped depressions formed in the layer of ceramic material defining a continuous labyrinth of walls of the ceramic material and defining a wear surface, the walls comprising a uniform thickness at the wear surface separating adjacent depressions;
wherein a representative measurement boundary defines a border of one half of the uniform wall thickness around one of the cross-shaped depressions;
wherein within the representative measurement boundary along the wear surface, a ratio of a total length of a perimeter of said one depression divided by an area of the measurement boundary is at least 0.9 per unit of measurement; and
wherein within the measurement boundary the area of said one depression at the wear surface divided by the area of the measurement boundary is between 0.4 and 0.6.

2. The gas turbine component of claim 1, further comprising the ratio of the perimeter length of said one depression divided by the area of the measurement boundary being at least 1.0 per unit of measurement.

3. The gas turbine component of claim 1, further comprising:
the ceramic material of the walls comprising a plurality of hollow ceramic spheres disposed in a ceramic matrix; and
the uniform wall thickness is between 0.5 and 1.5 times a diameter of a largest of the spheres.

4. The gas turbine component of claim 1, wherein the representative measurement boundary is a boundary within which an area of the wear surface is representative of an amount of surface area removed from the wear surface by the cross-shaped depressions versus an amount of surface area remaining in the wear surface.

5. A gas turbine component comprising:
a ceramic material defining a surface;
a repeating pattern of nested cross-shaped depressions in the surface, the depressions arranged in rows and columns defining a continuous labyrinth of walls, the walls extending in two orthogonal directions between adjacent ones of the depressions, the walls comprising a uniform thickness at the surface separating adjacent depressions and making the depressions discontinuous from each other;
the ceramic material of the walls comprising hollow ceramic spheres in a ceramic matrix, the thickness of the walls comprising 0.5-1.5 times a diameter of a largest of the hollow ceramic spheres;
wherein the depressions each comprise a cross-shaped geometry with a gap width that is equal to the wall thickness;
wherein a representative measurement boundary defines a border of one half of the uniform wall thickness around one of the cross-shaped depressions;
wherein within the representative measurement boundary the area of said one depression at the surface divided by a total area within the measurement boundary is between 0.4 and 0.6; and
wherein P/A defined as a perimeter length of said one depression at the surface divided by the total area of the measurement boundary is greater than 0.9 per unit of measurement.

6. The gas turbine component of claim 5 wherein the P/A is at least 1.0 per unit of measurement.

7. The gas turbine component of claim 5, wherein the repeating pattern of depressions comprises first and second cross-shaped depressions separated laterally by less than a width of the first cross-shaped depression and vertically by less than a height of the first cross-shaped depression.

8. The gas turbine component of claim 5, wherein the repeating pattern of the cross-shaped depressions comprises a plurality of rows and columns of the cross-shaped depressions, each row of cross-shaped depressions offset laterally from each adjacent row by approximately 40% of a distance of separation between the cross-shaped depressions in a given row, each column of cross-shaped depressions offset vertically from each adjacent column by 40% of a distance of separation between the cross-shaped depressions in a given column.

9. The gas turbine component of claim 8, wherein the distance of separation between the cross-shaped depressions in the given row is equal to the distance of separation between the cross-shaped depressions in the given column.

10. A gas turbine component comprising:
a ceramic material defining a surface;
a repeating pattern of unconnected nested cross-shaped depressions in the surface, the repeating pattern of cross-shaped depressions comprising a first row of unconnected cross-shaped depressions, a second row of unconnected cross-shaped depressions, the second row offset diagonally from the first row, and a third row of unconnected cross-shaped depressions, the third row offset diagonally from the first and second rows; and
a continuous labyrinth of walls separating and defining the cross-shaped depressions;

wherein a representative measurement boundary defines a border of one half of a wall thickness around one of the cross-shaped depressions; and wherein P/A defined as a perimeter length of said one depression at the surface divided by a total area of the measurement boundary is greater than 0.9 per unit of measurement.

11. The gas turbine component of claim 10, further comprising:

the ceramic material comprising a plurality of hollow ceramic spheres disposed in a ceramic matrix;

walls defined between adjacent depressions comprising the wall thickness of between 0.5 and 1.5 times a diameter of a largest of the spheres.

12. The gas turbine component of claim 10, wherein the representative measurement boundary is a boundary within which an area of the surface is representative of an amount of surface area removed from the surface by the cross-shaped depressions versus an amount of surface area remaining in the surface.

* * * * *